US007649532B2

(12) United States Patent
Cameron et al.

(10) Patent No.: US 7,649,532 B2
(45) Date of Patent: *Jan. 19, 2010

(54) COMPUTER GENERATED HOLOGRAM DISPLAY SYSTEM

(76) Inventors: Colin D. Cameron, QinetiQ Malvern, St. Andrews Road, Malvern, Worcestershire (GB) WR14 3PS; Peter C. Cowling, QinetiQ Malvern, St. Andrews Road, Malvern, Worchestershire (GB) WR14 3PS (*) Notice: Subject to any disclaimer, the term of this patent is extended or adjusted under 35 U.S.C. 154(b) by 0 days.

This patent is subject to a terminal disclaimer.

(21) Appl. No.: 11/848,217

(22) Filed: Aug. 30, 2007

(65) Prior Publication Data

US 2007/0291027 A1 Dec. 20, 2007

Related U.S. Application Data

(63) Continuation of application No. 10/415,958, filed as application No. PCT/GB01/04882 on Nov. 5, 2001, now Pat. No. 7,295,200.

(60) Provisional application No. 60/247,048, filed on Nov. 13, 2000.

(30) Foreign Application Priority Data

Jul. 11, 2007 (GB) .................................. 0027132.0

(51) Int. Cl.
*G06T 15/00* (2006.01)
*G06T 17/20* (2006.01)
*G09G 5/00* (2006.01)
*G03H 1/00* (2006.01)
*G03H 1/08* (2006.01)
*G03H 1/26* (2006.01)

(52) U.S. Cl. ........................ 345/419; 345/423; 345/584; 345/645; 359/9

(58) Field of Classification Search ................. 345/419, 345/423, 584, 645; 359/9
See application file for complete search history.

(56) References Cited

U.S. PATENT DOCUMENTS 4,408,277 A 10/1983 Cortellini et al.

(Continued)

FOREIGN PATENT DOCUMENTS

WO 9939308 8/1999

OTHER PUBLICATIONS

Lucente, et al., "Rendering interactive holographic images", Proc. of 22nd Annual Conf. on Computer Graphics and Interactive Techniques S. G. Mair and R. Cook, Eds., SIGGRAPH '95, ACM Press, New York, NY, pp. 387-394.*

(Continued)

*Primary Examiner*—Ulka Chauhan
*Assistant Examiner*—Roberta Prendergast
(74) *Attorney, Agent, or Firm*—Stolowitz Ford Cowger LLP

(57) ABSTRACT

A system includes a computer generated hologram (CGH) design plane and a processor capable of representing a three dimensional object. The processor is configured to represent a surface of the three dimensional object by a facet, impose a grid defining a set of nodes upon the facet, and associate object points with each node of the grid. The processor is further configured to orient the facet to include a common global origin in the CGH design plane and displace the object points away from their associated node in a random or pseudo random direction parallel to the CGH design plane.

30 Claims, 3 Drawing Sheets

U.S. PATENT DOCUMENTS

| | | | |
|---|---|---|---|
| 4,695,973 | A | 9/1987 | Yu |
| 5,056,039 | A | 10/1991 | Caulfield |
| 5,107,444 | A | 4/1992 | Wu |
| 5,119,214 | A | 6/1992 | Nishii et al. |
| 5,132,839 | A | 7/1992 | Travis |
| 5,194,971 | A * | 3/1993 | Haines ............ 359/9 |
| 5,220,622 | A | 6/1993 | Scarr |
| 5,243,665 | A * | 9/1993 | Maney et al. ............ 382/152 |
| 5,495,576 | A * | 2/1996 | Ritchey ............ 345/420 |
| 5,515,498 | A * | 5/1996 | Heuring ............ 345/561 |
| 5,534,704 | A | 7/1996 | Robinson et al. |
| 5,610,733 | A * | 3/1997 | Feldman et al. ............ 359/9 |
| 5,701,138 | A | 12/1997 | Othmer et al. |
| 5,739,930 | A | 4/1998 | Sato et al. |
| 5,740,342 | A * | 4/1998 | Kocberber ............ 345/420 |
| 5,742,293 | A | 4/1998 | Koyamada et al. |
| 5,805,783 | A | 9/1998 | Ellson et al. |
| 5,850,300 | A * | 12/1998 | Kathman et al. ............ 359/9 |
| 5,867,166 | A * | 2/1999 | Myhrvold et al. ............ 345/419 |
| 5,923,331 | A | 7/1999 | Dusseux et al. |
| 5,982,954 | A | 11/1999 | Delen et al. |
| 6,025,938 | A * | 2/2000 | Kathman et al. ............ 359/9 |
| 6,043,910 | A * | 3/2000 | Slinger ............ 359/3 |
| 6,195,184 | B1 | 2/2001 | Chao et al. |
| 6,226,005 | B1 * | 5/2001 | Laferriere ............ 345/426 |
| 6,256,038 | B1 * | 7/2001 | Krishnamurthy ............ 345/419 |
| 6,262,737 | B1 | 7/2001 | Li et al. |
| 6,269,170 | B1 | 7/2001 | Horikoshi et al. |
| 6,271,856 | B1 | 8/2001 | Krishnamurthy |
| 6,396,496 | B1 | 5/2002 | Pfister et al. |
| 6,437,919 | B1 | 8/2002 | Brown et al. |
| 6,441,816 | B1 * | 8/2002 | Nguyen et al. ............ 345/420 |
| 6,448,968 | B1 | 9/2002 | Pfister et al. |
| 6,480,190 | B1 | 11/2002 | Pfister et al. |
| 6,498,607 | B1 | 12/2002 | Pfister et al. |
| 6,542,157 | B1 | 4/2003 | Browne |
| 6,549,200 | B1 * | 4/2003 | Mortlock et al. ............ 345/419 |
| 6,549,308 | B1 * | 4/2003 | Camahort ............ 359/9 |
| 6,552,723 | B1 * | 4/2003 | Duluk et al. ............ 345/419 |
| 6,595,644 | B2 | 7/2003 | Kostrzewski et al. |
| 6,639,597 | B1 * | 10/2003 | Zwicker et al. ............ 345/427 |
| 6,721,101 | B2 | 4/2004 | Daniell |
| 6,741,247 | B1 * | 5/2004 | Fenney ............ 345/421 |
| 6,798,410 | B1 * | 9/2004 | Redshaw et al. ............ 345/427 |
| 6,847,485 | B2 | 1/2005 | Kathman et al. |
| 6,853,373 | B2 | 2/2005 | Williams et al. |
| 6,853,377 | B2 * | 2/2005 | Pharr ............ 345/426 |
| 6,940,505 | B1 * | 9/2005 | Savine et al. ............ 345/423 |
| 6,975,457 | B1 | 12/2005 | Greenaway et al. |
| 2002/0018299 | A1 | 2/2002 | Daniell |
| 2002/0034006 | A1 | 3/2002 | Kostrzewski et al. |

OTHER PUBLICATIONS

Lucente, M, "Interactive three-dimensional holographic displays: seeing the future in depth", SIGGRAPH Computer Graphics, vol. 31, issue 2, May 1997, pp. 63-67.*

Lucente, M, "Holographic bandwidth compression using spatial subsampling", Optical Engineering, SOC. of Photo-optical Instrumentation Engineering, vol. 35, No. 6, Jun. 1996, pp. 1-25.*

Plesniak et al., 1998, "Coincident display using haptics and holographic video", Proc. of SIGCHI Conf. on Human Factors in Computing Systems, C. Karat, A. Lund, J. Coutaz, & J. Karat, Eds, ACM Press/Addison-Wesley Pub. Co., pp. 304-311.*

Soferman, Z. et al., "Advanced graphics behind medical virtual reality: evolution of algorithms, hardware, and software interfaces", Proceedings of the IEEE, vol. 86, Issue 3, Mar. 1998, pp. 531-554.*

C. D. Cameron, D. A. Pain, M. Stanley, and C. W. Slinger, "Computational challenges of emerging novel true 3D holographic displays," Critical Technologies for the Future of Computing, S. Bains and L. J. Irakliotis, Eds., Proc SPIE, vol. 4109, pp. 129-140 (Jul. 2000).*

Lucente, "Diffraction-Specific Fringe Computation for Electro-Holography" Doctoral Thesis Dissertation, MIT Dept. of Electrical Engineering and Computer Science, Sep. 1994, 138 pages.*

Yoshinori Kajiki, et al., "Cylindrical large computer-generated holograms and hidden-point removal process", Proceedings of SPIE '96, Practical Holography X, vol. 2652, Jan. 29, 1996, pp. 29-35.*

Ichioka et al., "Optical information processing", Proceedings of the IEEE, vol. 84, Issue 5, pp. 674-719, May 1996.

USPTO; File History for U.S. Appl. No. 10/415,958 to Cameron, filed Nov. 5, 2001.

Sclaroff, S.; Pentland, A.P.; "On modal modeling for medical images: underconstrained shape description and data compression", Proceedings of the IEEE Workshop on Biomedical Image Analysis, Jun. 24-25, 1994, pp. 70-79.

Penner et al; Three Dimensional Data Manipulatin and Representation for Accurate and Realistic Data Visualization. degree. Systems, Man and Cybernetics, 1995, Intelligent Systems for the 21.sup.st Century, IEEE Internatinal Conference on Vancouver, BC, Canada, Oct. 22-25, 1995, New York, NY, USA IEEE, US, Oct. 22, 1995, pp. 1091-1096, XP010194420.

Dudgeon et al; "Fractal-Based Modeling of 3D Terrain Surfaces"; Southeastcon '96. Bringing Together Education, Science and Technology, Proceedings of the IEEE Tampa, FL, USA, Apr. 11-14, 1996, New York, NY, USA, IEEE, US, Apr. 11, 1996, pp. 246-252, XP010163681.

Article; "2001-A Holographic Odyssey"; Eureka, Feb. 2001, pp. 20-21.

* cited by examiner

Fig.1.
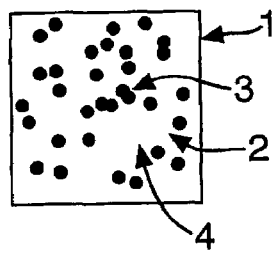
Fig.2(a). Fig.2(b).
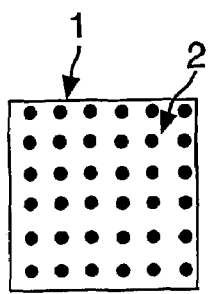 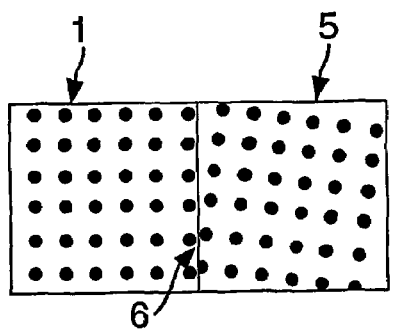
Fig.3(a). Fig.3(b). Fig.3(c).
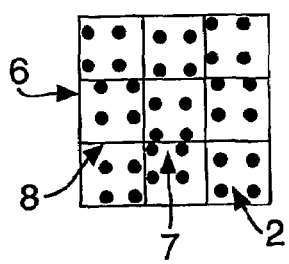 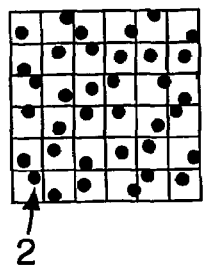 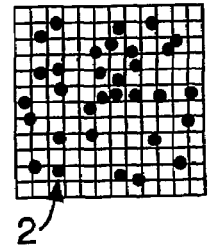

COMPUTER GENERATED HOLOGRAM DISPLAY SYSTEM

This application is a continuation of U.S. application Ser. No. 10/415,958, now U.S. Pat. No. 7,295,200, which is a US national phase of international application PCT/GB01/04882, filed Nov. 5, 2001 which designates the US. This application claims priority to and incorporates by reference in entirety the following applications: GB0027132.0, filed on Nov. 7, 2000 and U.S. provisional application 60/247,048, filed on Nov. 13, 2000.

FIELD OF INVENTION

This invention relates to a method of, and system for, representing a three dimensional object for display on a system capable of displaying objects in three dimensions. More specifically, it relates to methods of displaying images comprising of adjoining facets, where each facet is populated, or filled, with points to give the appearance from a distance of a continuous surface.

BACKGROUND

In performing the calculations required to display a computer generated hologram (CGH) using an interference based algorithm, it is necessary to populate the object to be displayed with an array of points that, when seen from a suitable distance, appear as a continuum. These are known as object points. It is usual in computer graphics fields to quantize the object to be displayed into a series of planar facets that approximate to the actual shape. The points that make up the object are populated onto these facets. An observer viewing such an object from a sufficiently large distance will tend to see not the individual points but instead the complete object as if it were drawn with continuous lines or areas of colour. For this to occur there must be a sufficient density of points such that the eye cannot distinguish between adjacent points. The human eye can resolve two points if the angle subtended from the eye to the points is typically greater than one minute of arc (290.mu. radians). By knowing the minimum eye to object distance likely to arise, a minimum object point population density can be calculated.

The facets themselves will generally be of differing sizes and will abut each other at different angles. If the object has curves, then the smaller these facets are, the closer they are able to provide a true representation of these curved areas. The facets will then be populated with object points. Each of these points forms a basic element of the picture, and taken together, these points make up the object to be displayed.

If it is desired to show part of an image having a continuous surface, there should be no sudden changes in object point population density. On a single facet, there is no problem in obtaining such a uniform density. However, when facets are joined together at different angles, the points will, in general, not flow from one facet to the other and still keep a localised uniform density. This leads to problems of non uniform density of object points across facet boundaries: too high a density will produce a bright area, whereas too low a density will produce a dark area on the object.

STATEMENT OF INVENTION

According to the present invention, there is disclosed a method for representing a three dimensional object in a computer system capable of displaying the object in three dimensions wherein, in use:

a surface of the object is approximated by a set of planar facets;

a grid defining a set of nodes is imposed upon each of the facets;

a point is associated with each node of the grid;

each point is moved away from its associated node on the plane of the facet;

the distance and direction of the movement is decided in a random or pseudo random manner;

such that the totality of points is used as the representation of the object.

The current invention discloses an object point arrangement having a grid, wherein the actual object points are not confined to being on the nodes of the grid. It has been found that random perturbations of points from the grid improves the behaviour of points at facet borders. Such a grid arrangement has the characteristic that it can be abutted to other orientations of itself whilst only having a minor effect on the point density in the region of the shared edge. Thus one facet having a particular grid orientation can adjoin another facet having a different orientation with little apparent change in point density.

One variation however is that if a substantially equilateral triangular grid is used, such that the apexes of the grid are all approximately equidistant from their six nearest neighbours, a satisfactory behaviour of the points at facet borders is obtained. It is, however, improved upon by adding the perturbations described herein.

The invention therefore provides a way to have the minimal density of points consistent with the resolving abilities of the human eye, yet avoid localised overpopulation or underpopulation of the object surface.

Preferably each grid imposed on each facet has a common origin and orientation relative to the global origin, having rotated the facet into a plane parallel to the display's design plane.

The invention is preferably implemented on a computer generated hologram display system, having a display capable of generating interference based holograms. The display panel itself is referred to in this specification as the CGH Design Plane (CDP).

The method of the current invention may be implemented as a computer program running on a computer system. The program may be stored on a carrier, such as a hard disk system, floppy disk system, or other suitable carrier. The computer system may be integrated into a single computer, or may contain distributed elements that are connected together across a network.

According to another aspect of the invention there is provided a computer generated hologram display system wherein a surface of the object is approximated by a set of planar facets;

a grid of related mathematical origin defining a set of nodes is imposed upon each of the facets;

a point is associated with each node of the grid;

each point is moved away from its associated node on the plane of the facet;

the distance and direction of the movement is decided in a random or pseudo random manner;

such that the totality of points is used as the representation of the object.

Such a display system implements the method as provided for elsewhere in this specification.

BRIEF DESCRIPTION OF DRAWINGS

Embodiments of the invention will now be described in detail, by way of example only, with reference to the accompanying drawings, in which:

FIG. 1 diagrammatically illustrates a single facet populated with random points;

FIG. 2 diagrammatically illustrates at a) a single facet populated with a rectangular array of points, and at b) two neighbouring facets that are each populated with points on rectangular grids that each have different orientations;

FIG. 3 diagrammatically illustrates the importance of maintaining the same grid origin across multiple facets as the facet size decreases.

DESCRIPTION OF EMBODIMENTS

Figure 4:
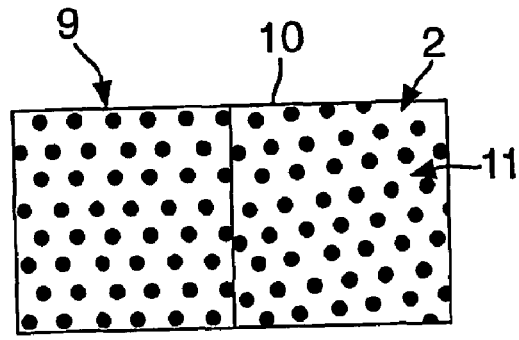
FIG. 4 diagrammatically illustrates one solution to the problem, wherein the mesh grid is laid out in the form of an equilateral triangular matrix.

FIG. 1 shows a single facet 1, as may be used to represent a part of an object, that has been populated with points 2 in a completely random fashion at a point density commensurate with a viewer distance such that in an idealised case the facet appears uniformly opaque. Some apparent clustering of the points can be seen, eg 3, as well as some denuded areas 4. These will show up on the object as an unevenness of brightness of that part of the object. The high density areas will appear to be too bright, and the denuded areas will appear as holes in the object.

FIG. 2a shows a solution that works over a single facet. The points 2 are arranged in a rectangular mesh that will appear of uniform density if viewed from a sufficient distance. This mesh does not behave so well when neighbouring facets using the same mesh are considered. FIG. 2b shows a typical example of neighbouring facets 1, 5 not lying on the same plane in 3D space that both have a rectangular mesh. In this case, a particularly high density of points is created 6 at the shared boundary of the facets. Equally, if the boundary had been in a different place, an area of sparse density could have been created. Thus a rectangular grid is undesirable.

Typically, many of the facets representing an object will be very small. The smaller the facet, the more accurately a curved surface can be represented. There is a tendency, therefore, for the facets that are used to approximate curved surfaces to have only a very few points per facet. At the required point density there can even be no points on a facet if it is small enough. These small facets having very few points have their own problems. FIG. 3a shows a set of nine small facets, each large enough to hold about 4 points. Although each facet (e.g. 6) has a regular grid and all facets share the same orientation, there is still an apparent bunching of the points at certain boundaries (e.g. 7), and a scarcity of points at other boundaries (e.g. 8). This is because the grids do not share a common origin as may be expected in the general case where the facets lie on different planes in 3D space. As facet size decreases the effect is increased (FIG. 3b), until eventually at FIG. 3c the points appear to be randomised, which of course has all the problems as discussed in relation to FIG. 1.

A solution to these problems has been found. FIG. 4 shows one embodiment of the solution. Here, each facet 9, 10 has points laid out on an equilateral triangular grid. A common origin is used to start the grid for each facet. This is achieved by rotating the facet by from its 3D orientation into a plane parallel to the CDP. The grid of points then starts from the global origin in each case. Following population the points are rotated by the inverse of the initial rotation to place them in the appropriate place on the original facet surface. It can be seen in FIG. 4 that when two facets 9, 10, each having such a grid layout, are laid adjacent to each other, the edge effects shown in FIG. 2 are much reduced, and there is very little apparent bunching or grouping of the points 2. For points that are not close to the edge of a facet (e.g. 11), it can be seen that each of these points 11 is equidistant from its six nearest neighbours. This is a consequence of the triangular layout.

Figure 5:
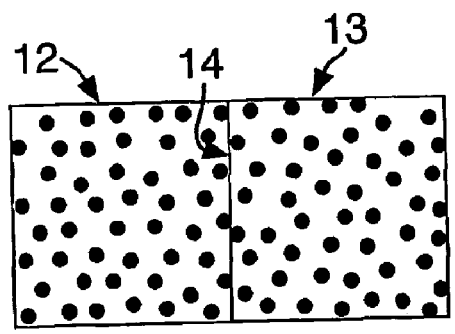
FIG. 5 diagrammatically illustrates an improved mesh arrangement to that of FIG. 4

Although this gives a good solution to the problem, it has been found that it can be improved upon. If each point on the triangular grid is subjected to a displacement in a random, or pseudo-random direction of a distance randomly or pseudo-randomly chosen within some bound then the edge effects described above are reduced further. A bound of ⅓ times the grid spacing works well in the current application, but the bound can be set to that suitable for the application. Other suitable bounds may be 0.4, or 0.25, or 0.18 times the grid spacing, but the invention is not limited to these. FIG. 5 shows two neighbouring facets 12, 13 with points based on a triangular matrix, but perturbed as described above within a bounding distance of 0.333. The superior behaviour at the edge 14 can be seen.

Figure 6:
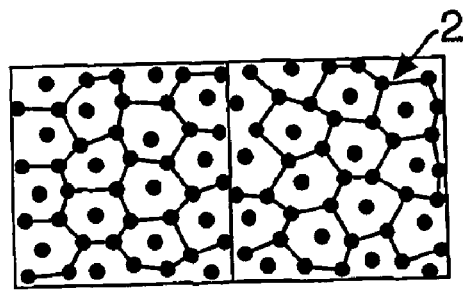
FIG. 6 diagrammatically illustrates the mesh arrangement of the points portrayed in FIG. 5

FIG. 6 shows that, despite first appearances, the points are indeed on a grid that has been distorted as described in the above paragraph.

Note that where FIGS. 1 to 6 represent the facets as having a border, no such border would be there in practice. Also, in practice, the facets lie on an arbitrary plane in 3D space and need not be square, but can have any number of sides, and be irregular in shape. The embodiments currently implemented have used predominantly triangular facets.

Figure 7:
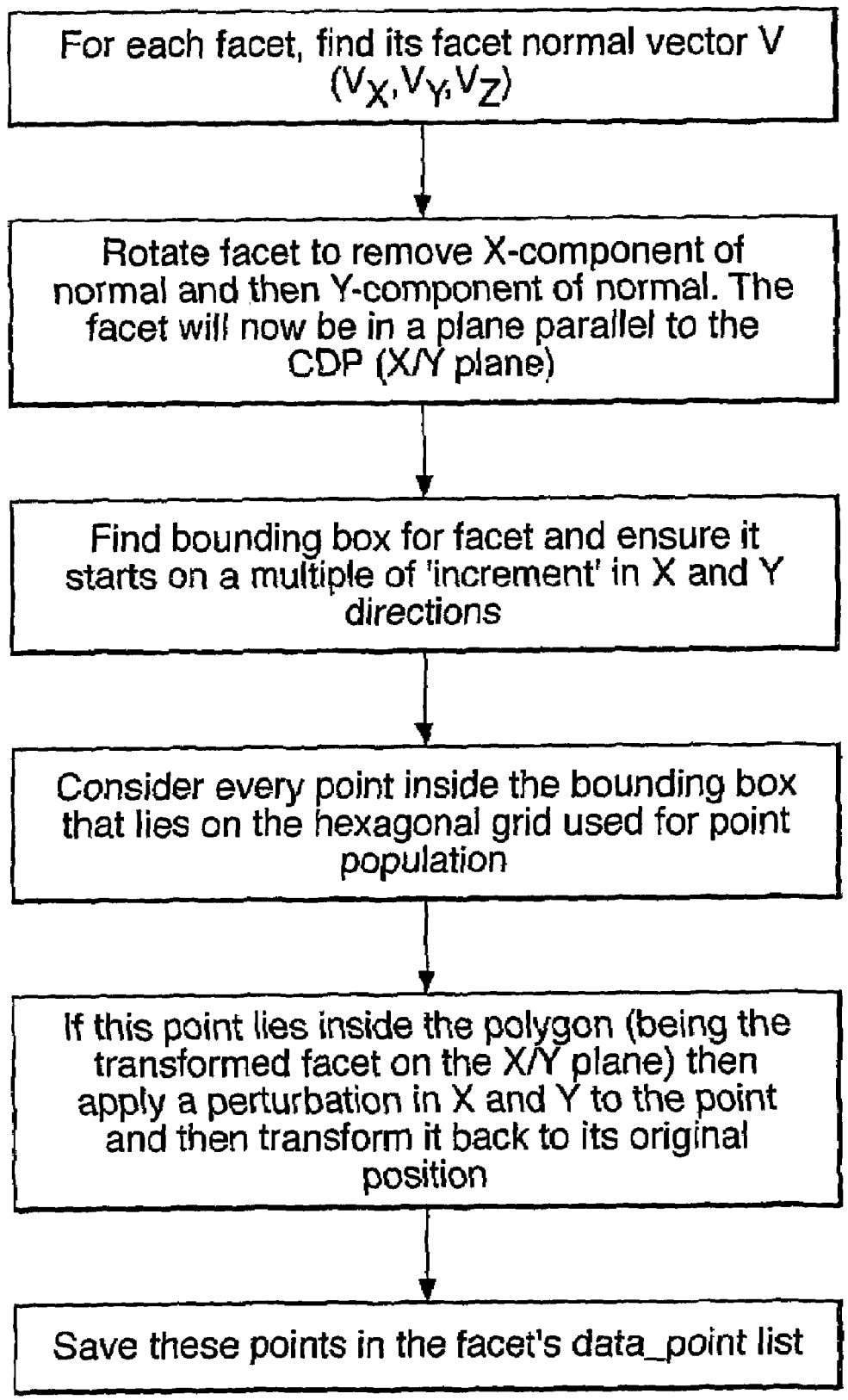
FIG. 7 shows a block diagram of the steps taken by the computer system in implementing the invention.

FIG. 7 shows a block diagram of the processing steps carried out in one embodiment of the invention. Here, the CDP is taken as having its own "global" hexagonal grid, which is used in the manner described below as the reference grid for each grid imposed on each of the facets. Once the facet has been rotated to be co-planar with the CDP, a bounding box is drawn around the facet such that it is the smallest rectangular box that is on the orientation of the grid that encloses the polygon that is the rotated facet. Points within this box that lie on intersections of the CDP's hexagonal grid are then taken to be object points. These are then perturbed, and then rotated back to the original orientation of the facet.

The current invention has been implemented on an Active-Tiling.®. Computer Generated Hologram (CGH) display system, though any 3D display system could be used, if it is capable of displaying true 3D images, and uses arrays of points to make up surfaces. The computer system itself could be a standalone unit, or could have remote elements connected by a network.

The Active Tiling system is a means of producing holographic moving images by rapidly replaying different frames of a holographic animation. The Active Tiling system essentially comprises a system for directing light from a light source onto a first spatial light modulator (SLM) means and relaying a number of SLM subframes of the modulated light from the first high speed SLM means onto a second spatially complex SLM. The CGH is projected from this second SLM.

The full CGH pattern is split up into subframes in which the number of pixels is equal to the complexity of the first SLM. These frames are displayed time-sequentially on the first SLM and each frame is projected to a different part of the second SLM. The full image is thus built up on the second SLM over time. The first SLM means comprises an array of the first SLMs that each tile individual subframes on the second SLM over their respective areas.

Light from an SLM in the array must not stray onto parts of the second SLM not intended for it. To prevent this a shutter can be placed between the first SLM means and the second SLM, which masks off those areas of the second SLM that are not currently being written to. Alternatively, electrodes on the second SLM that cover the area where it is not wished to write an image can simply be not provided with a drive voltage. Thus any light that is falling onto the second SLM in these areas has no effect on the modulation layer. This avoids the need for a shutter system. The first SLM of such a system is of a type in which the modulation pattern can be changed quickly, compared to that of the second SLM. Thus its updating frame rate is greater than the read-out frame rate of the second SLM.

The Active Tiling system has the benefit that the image produced at the second SLM, which is addressed at a rate much slower than that of the first SLM array, is effectively governed by the operation of the first SLM. This permits a trade off between the temporal information available in the high frame rate SLMs used in the SLM array and the high spatial resolution that can be achieved using current optically addressed SLMs as the second SLM. In this way, a high spatial resolution image can be rapidly written to an SLM using a sequence of lower resolution images.

See PCT/GB98/03097 for a full explanation of the Active Tiling system.

The invention claimed is:

1. A method comprising:
   approximating a surface of a three dimensional object by a first planar facet, where the surface of the three dimensional object is approximated by a computer system;
   imposing a first grid defining a set of nodes on the first planar facet, where the first planar facet includes a shared boundary with a neighboring facet;
   approximating a neighboring surface of the three dimensional object by a second planar facet, where the second planar facet is non co-planar with respect to the first planar facet;
   imposing a second grid defining a second set of nodes on the second planar facet;
   changing a planar orientation of the second planar facet so that the second grid and the first grid share a common origin; and
   displaying the three dimensional object as part of a computer generated hologram.

2. The method according to claim 1, where the first grid shares the common origin with the second grid when the first planar facet is co-planar with the second planar facet after changing the planar orientation of the second planar facet.

3. The method according to claim 1, further comprising:
   displacing object points on the second planar facet away from their associated nodes in a direction parallel to the second planar facet.

4. The method according to claim 3, where an associated node of a displaced object point is equidistant from its six nearest neighboring nodes.

5. The method according to claim 3, further comprising:
   rotating the object points back to an original orientation of the second planar facet.

6. The method according to claim 3, where the object points are displaced in a direction parallel to a computer generated hologram design plane, and where the second planar facet and the computer generated hologram design plane are co-planar after changing the planar orientation of the second planar facet.

7. The method according to claim 3, further comprising:
   drawing a smallest rectangular boundary box on the second grid that encloses the second planar facet to identify the object points to be displaced.

8. The method according to claim 7, where the object points lie on an intersection of a computer generated hologram design plane.

9. The method according to claim 3, further comprising:
   after displacing the object points, changing the orientation of the second planar facet back to being non co-planar with respect to the first planar facet.

10. The method according to claim 3, where the first planar facet includes a shared boundary with the second planar facet, and where the object points located along the shared boundary are displaced in a computer generated random or computer generated pseudo random direction.

11. A computer-readable medium having computer-readable instructions stored thereon that, if executed by a computing system, cause the computing system to perform operations comprising:
   replicating a three dimensional object with a planar facet and a plurality of neighboring facets, where the planar facet is non co-planar with one or more of the neighboring facets;
   changing a planar orientation of the planar facet parallel to a computer generated hologram design plane;
   imposing a grid defining a set of nodes upon the planar facet;
   drawing a smallest rectangular boundary box on the grid that encloses the planar facet;
   associating object points with the set of nodes of the grid in the rectangular boundary box;
   perturbing the object points away from their associated nodes;
   changing the planar orientation of the planar facet non-parallel to the computer generated hologram design plane after perturbing the object points; and
   displaying the three dimensional object as part of a computer generated hologram.

12. The computer-readable medium according to claim 11, where the operations further comprise:
   imposing a second grid upon a neighboring facet of the planar facet; and
   changing a planar orientation of the neighboring facet parallel to the computer generated hologram design plane so that the grid and the second grid share a common origin.

13. The computer-readable medium according to claim 12, where the grid and the second grid share the common origin when the planar facet and the neighboring facet are co-planar.

14. The computer-readable medium according to claim 11, where the operations further comprise:
   displacing the object points by a distance that is determined in a computer generated random or computer generated pseudo random manner.

15. The computer-readable medium media according to claim 11, where the object points lie on an intersection of the computer generated hologram design plane when the object points are perturbed away from their associated nodes, and where the operations further comprise:
   moving the object points off the intersection of the computer generated hologram design plane after the object points have been perturbed away from their associated nodes.

16. The computer-readable medium according to claim 11, where the object points are perturbed in a computer generated random or computer generated pseudo random direction parallel to the planar facet.

17. The computer-readable medium according to claim 11, where the planar orientation of the planar facet is changed to be parallel to the computer generated hologram design plane prior to perturbing the object points.

18. A system comprising:
a computer generated hologram (CGH) design plane; and
a computing device configured to:
represent a surface of a three dimensional object by a facet, where the facet is non co-planar with the CGH design plane;
impose a grid defining a set of nodes upon the facet;
associate object points with the set of nodes;
change an orientation of the facet to include a common global origin in the CGH design plane, where the facet is parallel with the CGH design plane;
display the three dimensional object.

19. The system according to claim 18, where the computing device further configured to:
draw a smallest rectangular boundary box on the grid that encloses the facet.

20. The system according to claim 18, where the computing device is further configured to:
displace the object points by a distance that is determined in a computer generated random or computer generated pseudo random manner.

21. The system according to claim 18, where the computing device is further configured to:
represent a neighboring surface of the three dimensional object by a second facet, where the second facet is non co-planar with the facet;
impose a second grid upon the second facet; and
change an orientation of the second facet to include the common global origin in the CGH design plane, where the second facet is parallel with the CGH design.

22. The system according to claim 21, where the grid and the second grid share the common global origin.

23. The system according to claim 8, where each node is equidistant from its six nearest neighbors.

24. The system according to claim 18, where the computing device is further configured to:
displace the object points away from their associated nodes in a direction parallel to the CGH design plane.

25. A computer generated hologram (CGH) system for representing a three dimensional object in a computer system and for displaying the object in three dimensions in a form of a computer generated hologram, the CGH system comprising:
a CGH design plane;
a surface of the object approximated by a set of planar facets;
a grid defining a set of nodes imposed upon each of the facets, where each grid imposed on each facet has a common origin and orientation relative to a global origin having rotated the facet into a plane parallel to the CGH design plane; and
a plurality of object points each associated with a node of the set of nodes, where each object point is moved away from its associated node on the plane of the facet, and where the computer generated hologram is displayed such that a totality of the object points is used as the representation of the object.

26. The system according to claim 25, where the grid is comprised of equilateral triangles such that each node of the grid is equidistant from each of the six nearest neighbors to that node.

27. The system according to claim 25, where a boundary of the distance of movement of each object point is between 0.18 and 0.4 times the separation distance between neighboring nodes of the grid.

28. The system according to claim 25, where a direction of the movement is decided in a computer generated random or a computer generated pseudo random manner.

29. The system according to claim 25, where, after moving each object point away from its associated node on the plane of the facet, the facet is rotated back into a plane that is non co-planar with the CGH design plane parallel to the surface.

30. The system according to claim 25, where a direction of the movement of each object point is decided in a random or a pseudo random manner.

* * * * *

UNITED STATES PATENT AND TRADEMARK OFFICE
CERTIFICATE OF CORRECTION

| | | |
|---|---|---|
| PATENT NO. | : 7,649,532 B2 | Page 1 of 1 |
| APPLICATION NO. | : 11/848217 | |
| DATED | : January 19, 2010 | |
| INVENTOR(S) | : Cameron et al. | |

It is certified that error appears in the above-identified patent and that said Letters Patent is hereby corrected as shown below:

On Title page, Item [76], line 4, please replace "QuinetiQ" with --QinetiQ--.
On Title page, Item [76], line 6, please replace "Worchestershire" with --Worcestershire--.
Column 1, line 5, please replace "10/415,958, now" with
--10/415,958, filed May 7, 2003, now--.
Column 6, line 59, please replace "computer-readable medium media" with
--computer-readable medium--.
Column 7, line 19, please replace "design plane;" with --design plane; and--.
Column 7, line 22, please replace "device further" with --device is further--.
Column 7, line 38, please replace "CGH design." with --CGH design plane.--.
Column 7, line 42, please replace "claim 8" with --claim 18--.
Column 8, line 32, please replace "where a direction" with --where the distance and direction--.
Column 8, line 38, please replace "design plane parallel to the surface" with --design plane--.

Signed and Sealed this
Seventeenth Day of July, 2012

David J. Kappos
*Director of the United States Patent and Trademark Office*